(12) United States Patent
Takahashi

(10) Patent No.: US 10,680,808 B2
(45) Date of Patent: Jun. 9, 2020

(54) 1:N BIOMETRIC AUTHENTICATION, ENCRYPTION, SIGNATURE SYSTEM

(71) Applicant: Hitachi, Ltd., Tokyo (JP)

(72) Inventor: Kenta Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 78 days.

(21) Appl. No.: 15/752,623

(22) PCT Filed: Mar. 21, 2017

(86) PCT No.: PCT/JP2017/011174
§ 371 (c)(1),
(2) Date: Feb. 14, 2018

(87) PCT Pub. No.: WO2017/164159
PCT Pub. Date: Sep. 28, 2017

(65) Prior Publication Data
US 2018/0241558 A1    Aug. 23, 2018

(30) Foreign Application Priority Data

Mar. 22, 2016 (JP) .................... 2016-056420

(51) Int. Cl.
*H04L 29/06* (2006.01)
*H04L 9/08* (2006.01)
(Continued)

(52) U.S. Cl.
CPC .......... *H04L 9/0866* (2013.01); *G06F 16/951* (2019.01); *G06F 21/32* (2013.01);
(Continued)

(58) Field of Classification Search
CPC ....... H04L 9/0866; H04L 9/3231; H04L 9/30; H04L 2209/805; H04L 2209/34; G06F 16/951; G06F 21/32
See application file for complete search history.

(56) References Cited

U.S. PATENT DOCUMENTS 6,038,315 A    3/2000 Strait et al.
7,644,443 B2 *  1/2010 Matsuyama ............ G06F 21/10
                                                726/27
(Continued)

FOREIGN PATENT DOCUMENTS

JP    2001-197055 A    7/2001
JP    2002-532997 A   10/2002
(Continued)

OTHER PUBLICATIONS

Patel et al., "Cancelable Biometrics: A review", IEEE Signal Processing Magazine ( vol. 32 , Issue: 5 , Sep. (Year: 2015).*
(Continued)

*Primary Examiner* — Morshed Mehedi
(74) *Attorney, Agent, or Firm* — Mattingly & Malur, PC

(57) ABSTRACT

A biometric authentication system has a terminal which extracts and encodes feature data for authentication from acquired biometric information, and which transmits the encoded feature data for authentication. The system has a DB for storing encrypted authentication information, a search unit which searches for encrypted authentication information included in the DB, and a decryption unit which decrypts the encrypted authentication information searched for using encoded feature data for authentication as a decryption key. Accordingly, a user is uniquely identified using the obtained authentication information. Further, a processing unit performs authentication response processing with respect to the identified user, based on authentication information obtained by decryption. Thus, authentication is implemented without limiting user and terminal combinations, without reconfiguring a service server, and without requiring a user to enter an ID or present a card at the terminal, when a user utilizes existing services from one or plural terminals.

16 Claims, 7 Drawing Sheets

(51) Int. Cl.
*G06F 16/951* (2019.01)
*G06F 21/32* (2013.01)
*H04L 9/32* (2006.01)
*H04L 9/30* (2006.01)

(52) U.S. Cl.
CPC .............. *H04L 9/30* (2013.01); *H04L 9/3231* (2013.01); *H04L 2209/34* (2013.01); *H04L 2209/805* (2013.01)

(56) References Cited

U.S. PATENT DOCUMENTS

| | | | |
|---|---|---|---|
| 10,205,723 B2* | 2/2019 | Farrell | H04L 63/0861 |
| 2002/0124176 A1 | 9/2002 | Epstein | |
| 2003/0005310 A1* | 1/2003 | Shinzaki | G06F 21/32 |
| | | | 713/186 |
| 2006/0250213 A1* | 11/2006 | Cain, Jr. | G06F 21/32 |
| | | | 340/5.52 |
| 2010/0106964 A1* | 4/2010 | Hirata | H04L 63/0861 |
| | | | 713/155 |
| 2011/0016327 A1* | 1/2011 | Suzuki | G06F 21/32 |
| | | | 713/186 |
| 2011/0099385 A1* | 4/2011 | Takahashi | H04L 63/0861 |
| | | | 713/186 |
| 2013/0212645 A1* | 8/2013 | Takahashi | H04L 9/3231 |
| | | | 726/3 |
| 2013/0318351 A1* | 11/2013 | Hirano | H04L 9/3073 |
| | | | 713/168 |
| 2014/0281567 A1* | 9/2014 | Rane | G06F 21/32 |
| | | | 713/186 |
| 2015/0215316 A1* | 7/2015 | Zeljkovic | H04L 9/3231 |
| | | | 726/6 |
| 2016/0204936 A1* | 7/2016 | Sakemi | H04L 9/0869 |
| | | | 380/28 |
| 2016/0248752 A1* | 8/2016 | Blinn | H04L 63/083 |
| 2017/0116615 A1* | 4/2017 | Burgess | G06F 16/9017 |

FOREIGN PATENT DOCUMENTS

| | | |
|---|---|---|
| JP | 2006-113710 A | 4/2006 |
| JP | 2011-253329 A | 12/2011 |
| JP | 2011-253378 A | 12/2011 |

OTHER PUBLICATIONS

Upmanyu et al., "Blind Authentication: A Secure Crypto-Biometric Verification Protocol", IEEE Transactions on Information Forensics and Security, vol. 5, Issue: 2, Jun. (Year: 2010).*
Mehta et al., "Edge based selective encryption scheme for biometric data using chaotic thory", 2014 International Conference on Contemporary Computing and Informatics (IC3I), Date of Conference: Nov. 27-29 (Year: 2014).*
Y. Dodis, et. al, "Fuzzy extractors: How to generate strong keys from biometrics and other noisy data", In Eurocrypt 2004, vol. 3027 of LNCS, pp. 523-540, 2004.
International Search Report of PCT/JP2017/011174 dated Mar. 21, 2017.

* cited by examiner

FIG. 2

BIOMETRIC ENCRYPTED AUTHENTICATION INFORMATION DB

| MANAGEMENT ID | SERVICE IDENTIFIER | AUTHENTICATION METHOD TYPE | BIOMETRIC ENCRYPTED AUTHENTICATION INFORMATION |
|---|---|---|---|
| MID1 | SID1 | PW (Basic) | **** |
| MID2 | SID2 | PW (Digest) | **** |
| MID3 | SID3 | PKI | **** |
| MID4 | SID3 | PKI | **** |
| MID5 | SID4 | FIDO | **** |
| ... | ... | ... | ... |

AUTHENTICATION FLOW

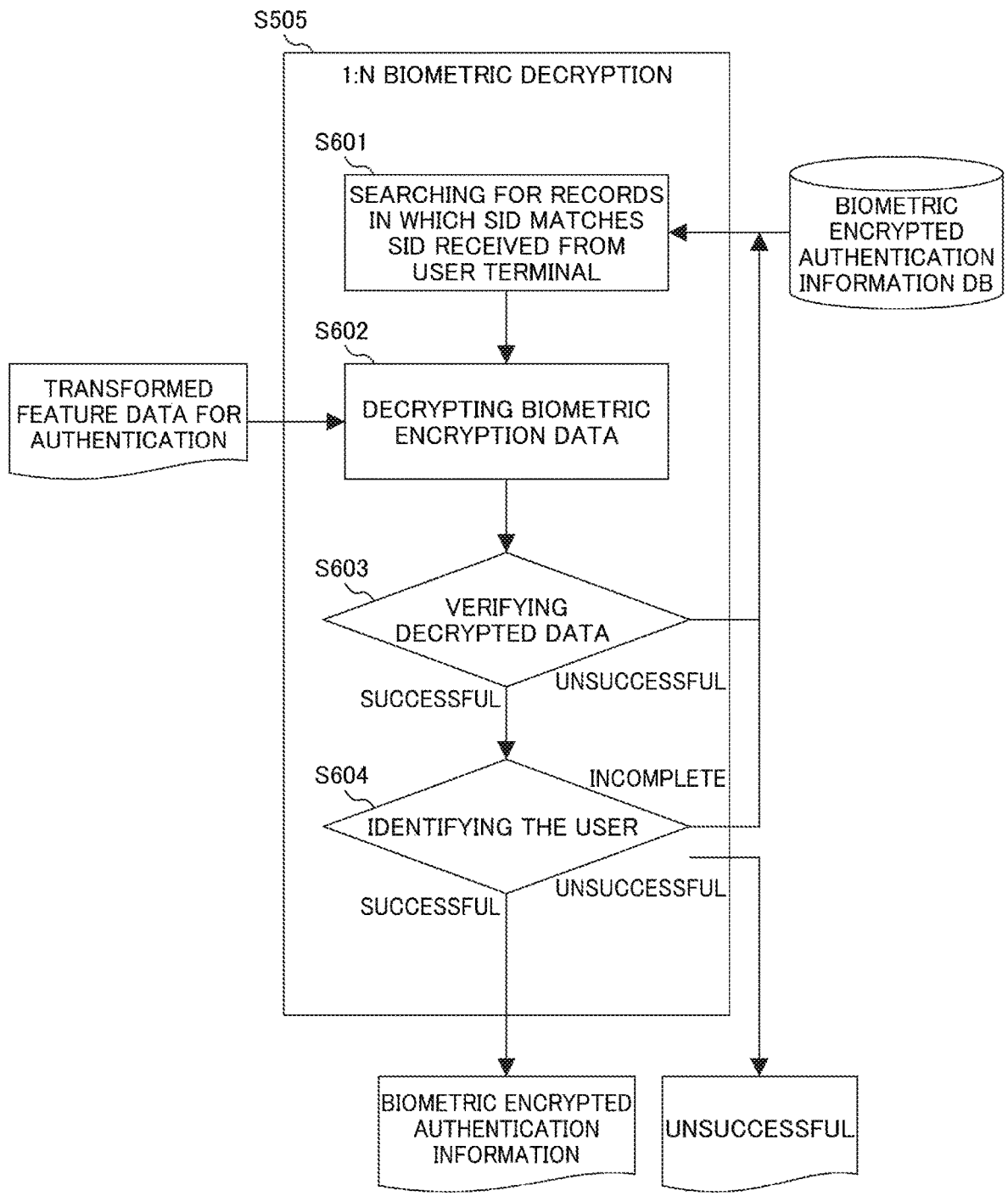

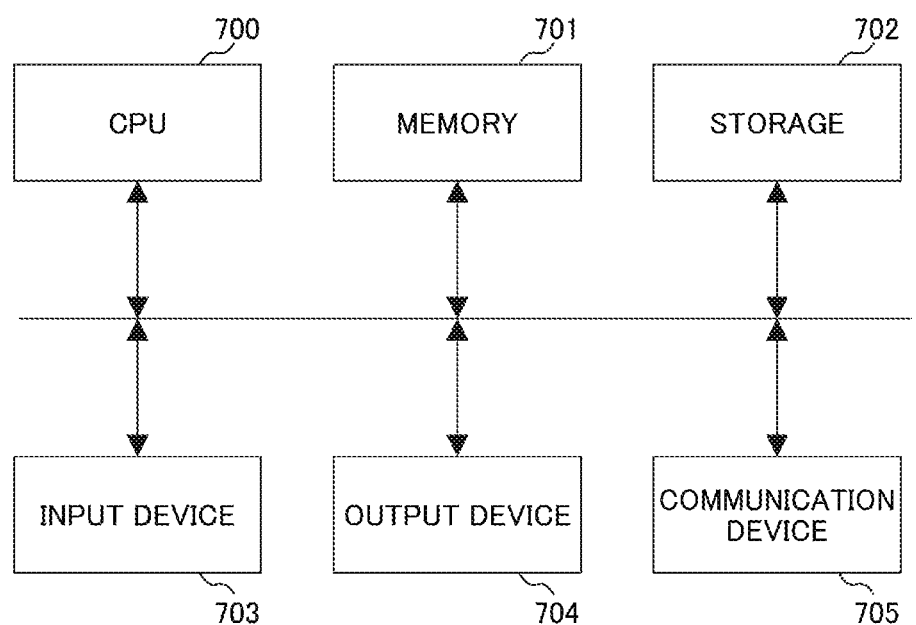

1:N BIOMETRIC AUTHENTICATION, ENCRYPTION, SIGNATURE SYSTEM

BACKGROUND OF INVENTION

The present invention relates to a system that performs processes such as authentication, encryption, and signature based on biometric information specific to an individual person.

Along with evolution of information technology (IT) in all sectors of society, it is becoming increasingly important to identify and authenticate a user reliably in various scenes such as ATMs in banks, online banking, credit card payment, Web services, entering and leaving management, attendance management, use of hotels and members' facilities, etc. Conventionally, an identification and authentication method using a password, an ID card, or the like, has predominated. However, there are an increasing number of victims of identity theft by a password list attack, card counterfeiting, etc. and expectations are raised for a biometric authentication technology that identifies and authenticates an individual person based on biometric information such as fingerprints, veins, faces, and irises as a more reliable and convenient means for authentication.

With an increase in the number of systems and services that a person uses, the number of IDs, passwords, and cards that one user must manage increases accordingly and this reduces convenience; additionally, there arises a problem in which security decreases, such as recycling the same password and an increase in a risk of card theft and counterfeiting.

Because of this background, attempts are proposed to make a variety of services available only by undergoing biometric authentication; for example, UAF standards formulated by FIDO Alliance define a protocol in which, if biometric authentication is successful at a user terminal (smartphone, PC, etc.), a challenge-response authentication based on a public key encryption technology is performed between the terminal and a server through the use of a secret key within the terminal. A user should register his or her biometric information with his or her terminal beforehand, create a pair of his or her secret key and a public key for each service (e.g., Online Payment, Netbanking, etc.), and register the secret key with the terminal and the public key with each service server; subsequently, the user can utilize each service only by presenting the biometric information to his or her terminal. In this method, however, a user is required to pre-register his or her biometric information and a secret key per service with a terminal. Hence, FIDO assumes a way of use in which a user owns one or two terminals and access to each service is only made from this terminal(s) owned by the user. However, in a way of use in which one or plural terminals are shared by plural users or many and unspecified users at ATMs and POS terminals and in an office, a college, or the like and in a case where one user owns many terminals or a case where one user renews a terminal frequently, the FIDO/UAF method poses a problem in which operation for registration is complicated (reducing convenience) and a problem of increasing the risk of leakage of highly confidential and sensitive information, i.e., biometric information and secret keys (safety decreases).

Meanwhile, a technology called biometric encryption draws attention as a technology that protects biometric information that has been registered and stored and reduces the risk of leakage considerably. When registering biometric information, the biometric encryption extracts a feature metric X from the biometric information and adds random number information R to X, which is a kind of processing to conceal the feature metric X, thus creating data H which is called auxiliary information. The auxiliary information H is stored in, inter alia, a user terminal. When authentication is performed, a feature metric X' is extracted from newly acquired biometric information and R' is restored by executing restoration processing for auxiliary information H using X'. When and only when X' is sufficiently close to X, correct random number information is to be restored (R=R'). Moreover, an algorithm is designed so that estimating X and R from H is sufficiently difficult, unless knowing X' that is sufficiently close to X. By registration and matching check of a value of R or a hash value of R, authentication can be accomplished with the feature metric X extracted from the registered biometric information remaining concealed; besides, by regarding a value of R or a hash value of R as a secret key and executing processes of data encryption and decryption and generating electronic signature, encryption/decryption and electronic signature based on biometric information can be implemented without holding a secret key directly.

In combination of biometric encryption with the FIDO/UAF standards, a user is not required to store biometric information and a secret key in his or her terminal and, instead, auxiliary information H is only required to be stored. This enables it to reduce the risk of leakage of biometric information and secret keys. However, given that the above combination is applied to the way of use in which when one or plural terminals are shared by plural users or many and unspecified users, the problem in which operation for registration is complicated (reducing convenience) is still left unsolved. Furthermore, random number information R restoration processing in biometric encryption may require complicated calculation such as error correction processing and cryptographic processing and there is also a problem in which, considering the amount of calculation, it is difficult to execute restoration processing for auxiliary information relevant to a large number of users within a terminal having limited calculation capability.

Furthermore, authentication based on FIDO/UAF can be utilized only with a service server compliant with the FIDO/UAF standards. Biometric encryption can also be utilized only with a service server with its specific authentication functionality installed therein. Hence, for a variety of existing online services that use exiting authentication means such as password authentication and PKI authentication, utilizing a service only by undergoing biometric authentication without reconfiguring a server cannot be implemented by the foregoing technologies.

CITATION LIST

Non-Patent Literature

NPL 1: Y. Dodis, et. Al, "Fuzzy extractors: How to generate strong keys from biometrics and other noisy data", In Eurocrypt 2004, Vol 3027 of LNCS, pp 523-540, 2004.

SUMMARY OF INVENTION

Technical Problem

The present invention is intended to implement convenient and safe authentication only by undergoing biometric authentication without limiting user and terminal combinations, without reconfiguring a service server, and without requiring a user to enter an ID or present a card among others, when a user utilizes a variety of existing online services from one or plural terminals. The invention is also intended to implement the above authentication without directly storing highly confidential information and sensitive information such as biometric information for registration and its feature metric data, a secret key, a password, user ID, and personal information.

Solution to Problem

To address the foregoing problems, an authentication system according to the present invention comprises a user terminal comprising a sensor which acquires biometric information of a user, a feature extraction unit which extracts feature data for authentication from acquired biometric information, a feature data encoding unit which encodes feature data for authentication, thus creating encoded feature data for authentication, and a transmitting unit which transmits identification request information including encoded feature data for authentication to an external entity; and an authentication server comprising a DB for storing biometric encrypted authentication information, a search unit which searches for biometric encrypted authentication information included in the DB, based on identification request information, a decryption processing unit which decrypts biometric encrypted authentication information searched out using encoded feature data for authentication as a decryption key and uniquely identifies a user, based on authentication information obtained by decryption, and an authentication response processing unit which performs authentication response processing with respect to the identified user, based on authentication information obtained by decryption, instead of the user terminal.

Advantageous Effects of Invention

According to the present invention, authentication can be performed conveniently and safely only by undergoing biometric authentication without limiting user and terminal combinations, without reconfiguring a service server, and without requiring a user to enter an ID or present a card among others, when a user utilizes a variety of existing online services from one or plural terminals.

BRIEF DESCRIPTION OF DRAWINGS

FIG. 2 is a diagram illustrating a biometric encrypted authentication information DB according to the embodiment of the present invention.

FIG. 6 is a flow diagram illustrating a 1:N biometric decryption process according to the embodiment of the present invention.

FIG. 7 is a block diagram depicting a hardware configuration of a registration terminal, a user terminal, a 1:N authentication server, and a service providing server according to the embodiment of the present invention.

DESCRIPTION OF EMBODIMENTS

Example 1

In the following, one embodiment of the present invention will be described with reference to the drawings.

This embodiment is applicable for a case where one or plural terminals are shared by plural users or many and unspecified users at ATMs and POS terminals and in an office, a college, or the like. The embodiment is also applicable for a case where one user owns many terminals. The embodiment is further applicable for a case where one user renews a terminal frequently. According to the present embodiment, it is possible to perform user authentication and identification of a person without requiring a user to present his or her ID, password, or card among others, when utilizing a variety of services such as online payment, credit card payment at a shop, Netbanking, diverse Web services, logging into an information system, and opening/closing of an automatic ticket gate.

And now, biometric information is assumed to be veins running through a finger or a palm, fingerprints, faces, irises, etc.

Figure 1:
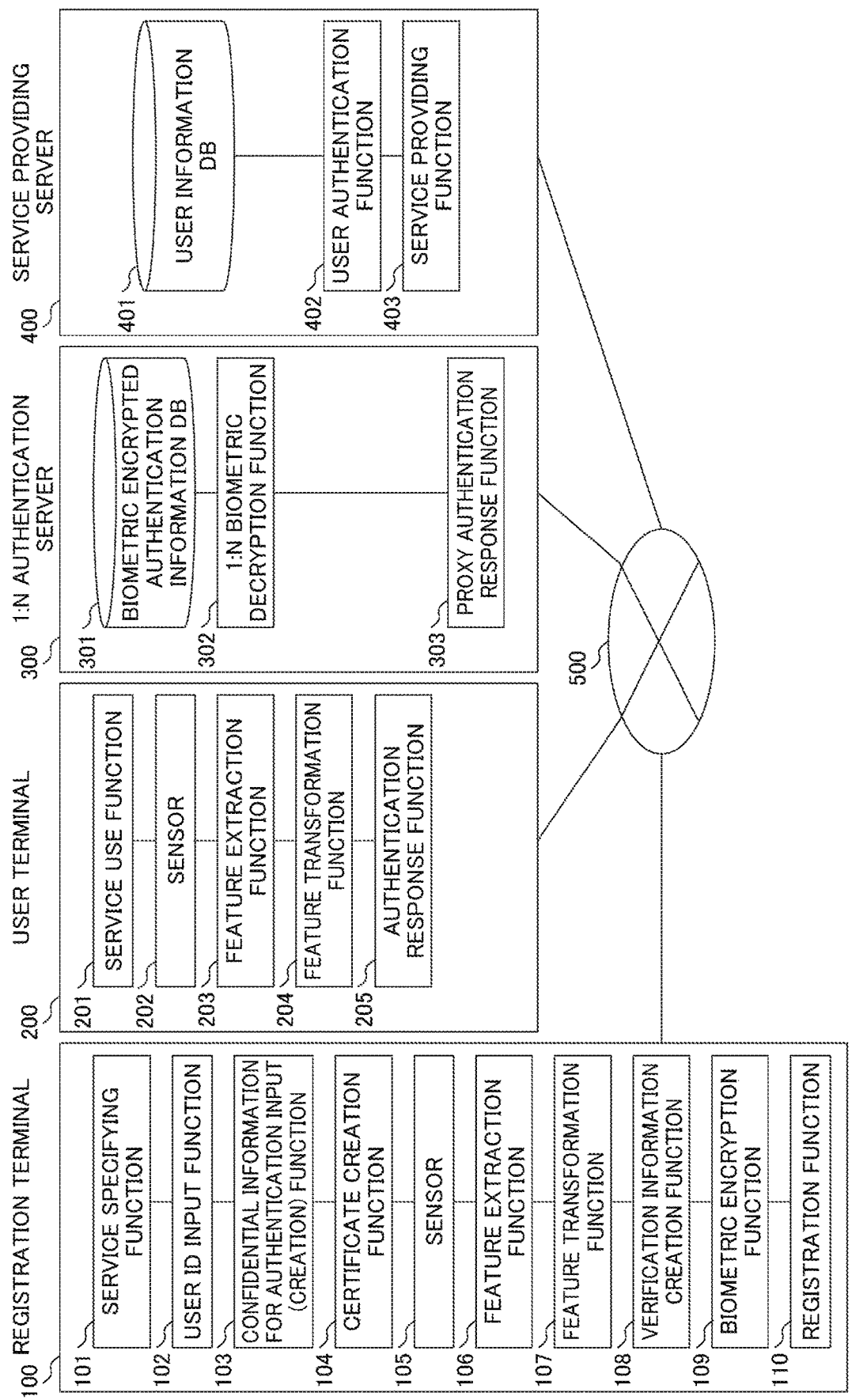
FIG. 1 is a block diagram depicting a functional configuration of an embodiment of the present invention.

FIG. 1 depicts a system configuration of a biometric authentication system according to the present embodiment. The present system is comprised of a registration terminal 100 which registers user-specific biometric information and authentication information for diverse services after transforming such information into a safe form, a user terminal 200 for a user to utilize diverse services, a 1:N authentication server 300 which identifies a user based only on biometric information, decrypts the user authentication information for a service, and performs authentication response processing as a proxy, and a service providing server 400 which provides a service to the user via the user terminal, and a network 500 which interconnects these terminals and servers. Here, the user terminal 200 is assumed to be a PC, a smartphone, or a tablet shared by persons or used by a person at an office, college, home, etc. or an ATM at a bank or a POS terminal, a terminal for business use, etc. It is assumed that plural user terminals having the same configuration exist. The registration terminal 100 may be the same terminal as the user terminal 200 or may be a separate terminal. Moreover, an operator of the registration terminal may be the user himself or herself or may be another operator other than the user or a system administrator. The service providing server 400 may be a banking server or a payment server, a Web service server, an authentication server of an information system at a company or college, etc. and plural servers typically exist. In the present embodiment, user authentication functionality (such as, e.g., password Basic authentication, password Digest authentication, PKI authentication, and FIDO authentication) in the service providing server 400 can be used as is without a need for reconfiguring it biometric authentication.

The registration terminal 100 is comprised of a service specifying function 101 which allows a user to specify or select a service that the user wants to utilize only by undergoing biometric authentication, a user ID input function 102 for inputting a user ID for a service, a confidential information for authentication input (creation) function 103 for inputting or creating confidential information for authentication (such as a password or a secret key) associated with a user ID for a service, a certificate creation function 104 which creates a public key certificate mapping to a secret key, if the user authentication functionality is, inter alia, PKI authentication, a sensor 105 which acquires biometric information for registration, a feature extraction function 106 which extracts feature data for registration from biometric information for registration, a feature transformation function 107 which makes a transformation to conceal feature data for registration, thus creating transformed feature data, a verification information creation function 108 which creates verification information associated with authentication information (which will be detailed later in FIG. 4) for a service, a biometric encryption function 109 which encrypts a combination of authentication information and verification information using transformed feature data for registration as a kind of encryption key, based on a biometric encryption technology, thus creating biometric encrypted authentication information, and a registration function 110 which registers biometric encrypted authentication information in association with the identifier of the service (SID) and information representing the type of an authentication method for the service with the 1:N authentication server 300.

The user terminal 200 is comprised of a service use function 201 for utilizing diverse services, a sensor 202 which acquires biometric information for authentication, a feature extraction function 203 which extracts feature data for authentication from biometric information for authentication, a feature transformation function 204 which makes a transformation to conceal feature data for authentication, thus creating transformed feature data, an authentication response function 205 which performs an authentication response to a user identification and authentication request from the service providing server 400 for a service through the use of the 1:N authentication server 300.

And now, the sensor 202 can be selected, as appropriate, according to biometric information to be acquired. If, for example, finger veins are adopted as biometric information, it is assumed that an image capturing unit or the like is used as the sensor; after a finger is irradiated with light emitted from a light source, which is not depicted, this unit captures transmitted light through the finger.

The 1:N authentication server 300 is comprised of a biometric encrypted authentication information DB 301 which stores biometric encrypted authentication information in association with, inter alia, a service identifier (SID) and information representing the type of an authentication method for the service, a 1:N biometric decryption function 302 which identifiers a user from the biometric encrypted authentication information DB 301 and restores authentication information associated with a service based on the service identifier (SID) and transformed feature data for authentication received from the user terminal 200, and a proxy authentication response function 303 which performs user authentication response processing as a proxy; this response is transmitted via the user terminal 200 to the service providing server 400.

The service providing server 400 is comprised of a user information DB 401 for management of user information such as user ID, a password or a hash value of a password, and a public key, a user authentication function 402 which performs user authentication based on authentication information, and a service providing function 403 which provides a service to the user terminal 200, if authentication is successful.

A service mentioned herein is assumed to be any of the following: online payment, credit card payment at a shop, Netbanking, diverse Web services, logging into an information system, opening/closing of an automatic ticket gate, etc., as noted previously.

FIG. 2 illustrates information that is managed with the biometric encrypted authentication information DB 301.

Each of records that are registered in the DB includes a management ID (MID) which is assigned by the registration terminal 100 or the 1:N authentication server 300 for management of the respective records, a service identifier (SID) which is specified with the service specifying function 101, the type of an authentication method that is used for a service (such as password Basic authentication, password Digest authentication, PKI authentication, or FIDO authentication), and biometric encrypted authentication information. One record may include plural pieces of biometric encrypted authentication information. Additionally, plural records may be registered with respect to one user.

FIG. 7 depicts a hardware configuration of the registration terminal 100, user terminal 200, 1:N authentication server 300, and service providing server 400 according to the present embodiment. They can be configured of a CPU 700, a memory 701, a storage 702, an input device 703, an output device 704, and a communication device 705, as in the figure.

Figure 3:
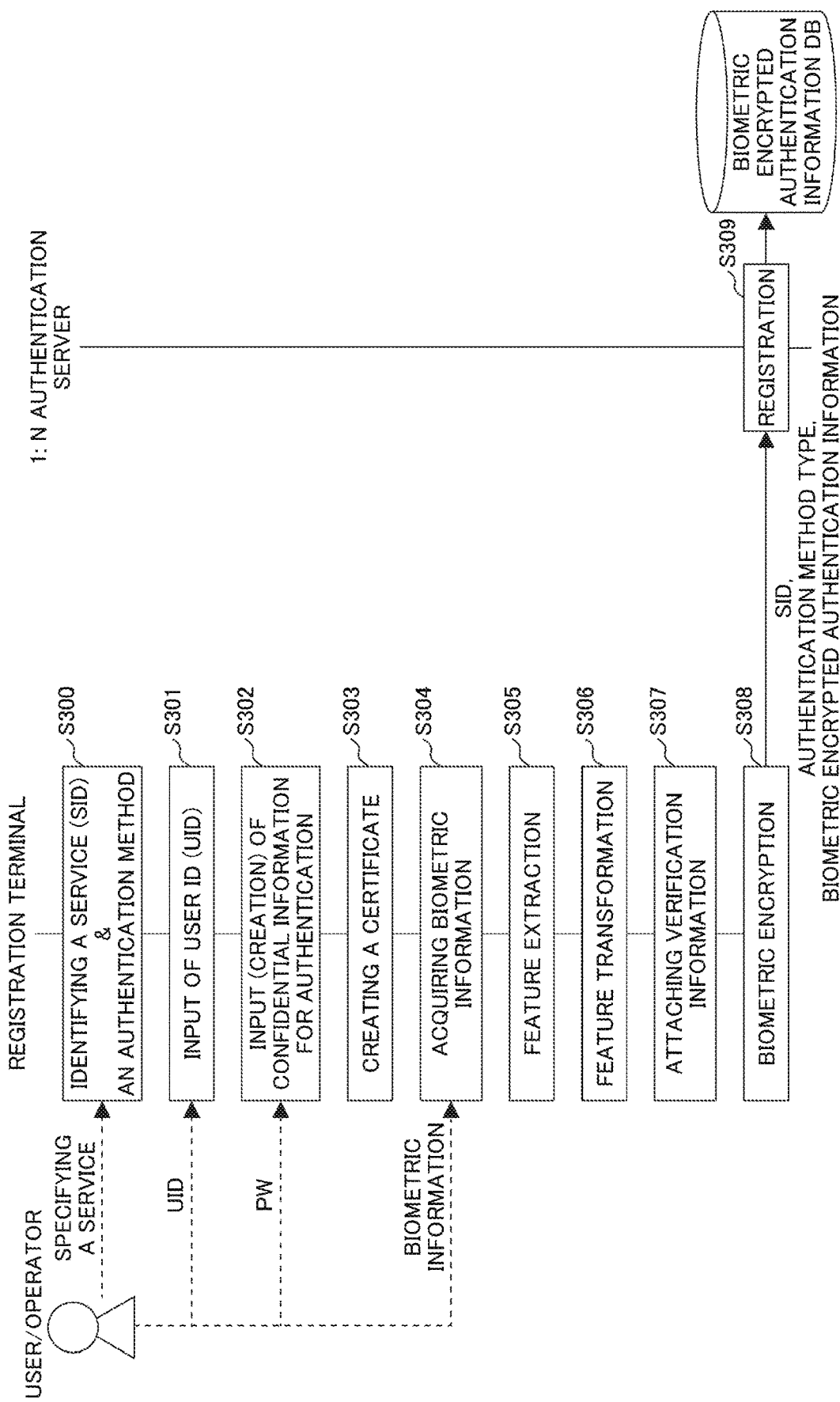
FIG. 3 is a flow diagram illustrating a registration process according to the embodiment of the present invention.

FIG. 3 is a diagram illustrating a registration process flow according to the present embodiment.

S300 is a processing step in which the registration terminal 100 identifies the identifier of a service to be utilized and the type of an authentication method for the service according to operation or the like by a user or an operator.

S301 is a processing step in which the registration terminal 100 accepts input of user ID (UID).

S302 is a processing step in which the registration terminal 100 accepts input of confidential information for authentication, the information being appropriate for the authentication method type for the service, or creates such confidential information for authentication. For instance, in the case of password authentication, it accepts input of a password. In the case of PKI authentication or FIDO authentication, it generates a pair of a secret key and a public key.

S303 is a processing step in which the registration terminal 100 creates a certificate of authentication information the certificate being appropriate for the authentication method. For instance, in the case of PKI authentication, it creates a public key certificate including a public key.

S304 is a processing step in which the registration terminal 100 acquires user's biometric information for registration through the sensor 105.

S305 is a processing step in which the registration terminal 100 extracts feature data for registration from the biometric information for registration.

S306 is a processing step in which the registration terminal 100 transforms the feature data for registration, thus creating transformed feature data for registration. A concrete example of transformation will be described later in a later part of description with regard to FIG. 5. This step enables it to conceal feature data for authentication as well, which will be described later, as against the 1:N authentication server 300 mentioned previously. However, making feature data for registration secrete can be accomplished without executing this step.

S307 is a processing step in which the registration terminal 100 attaches verification information to authentication information. A concrete method will be described later with FIG. 4.

S308 is a processing step in which the registration terminal 100 encrypts authentication information using feature data for registration as a kind of encryption key, based on a biometric encryption technology, thus creating biometric encrypted authentication information, and transmits this information together with the service identifier (SID) and the authentication method type to the 1:N authentication server 300 mentioned previously. Detail hereof will be described later in a later part of description with regard to FIG. 5.

S309 is a processing step in which the 1:N authentication server 300 receives the service identifier (SID), authentication method type, and biometric encrypted authentication information and registers them into the biometric encrypted authentication information DB 301.

Figure 4:
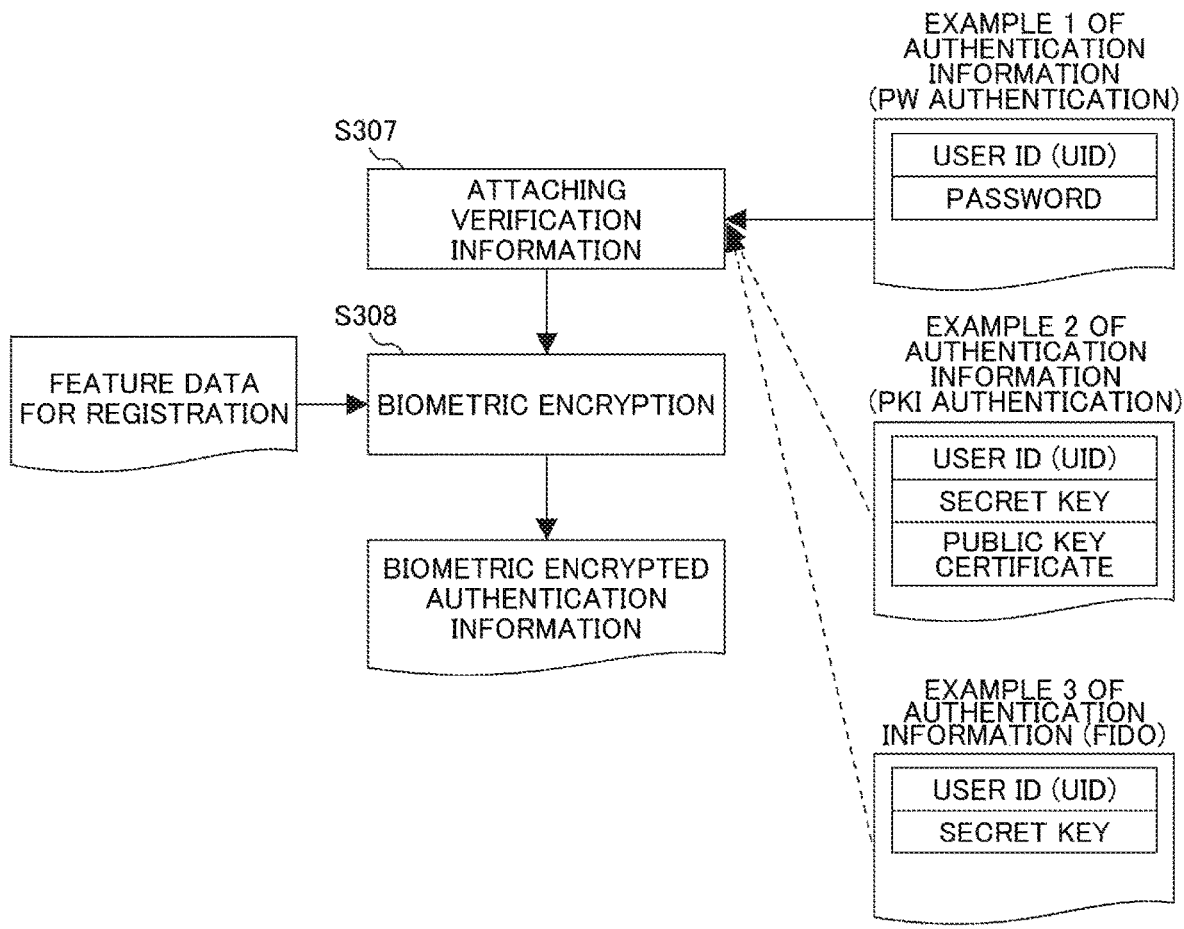
FIG. 4 is a flow diagram illustrating examples of authentication information and a biometric encryption process according to the embodiment of the present invention.

FIG. 4 is a flow diagram illustrating concrete examples of authentication information and a biometric encryption process. And now, S307 and S308 in this figure are the same steps as illustrated in FIG. 3.

Various types of authentication methods are assumed. For instance, in the case of password authentication (including Basic authentication and Digest authentication) (Example 1 of authentication information), authentication information includes user ID (UID) and a password. In the case of PKI authentication (Example 2 of authentication information), authentication information includes a secrete key and a public key certificate. In the case of FIDO authentication (Example 3 of authentication information), authentication information includes user ID (UID) and a secret key.

In the step, S307 of attaching verification information, a calculation is made of, inter alia, a checksum or a hash value or MAC (message authentication code) of authentication information and a result of the calculation is attached to the authentication information as verification information.

In the step, S308 of biometric encryption, the process encrypts authentication information using feature data for registration as an encryption key, as described with FIG. 3, thus creating biometric encrypted authentication information.

Figure 5:
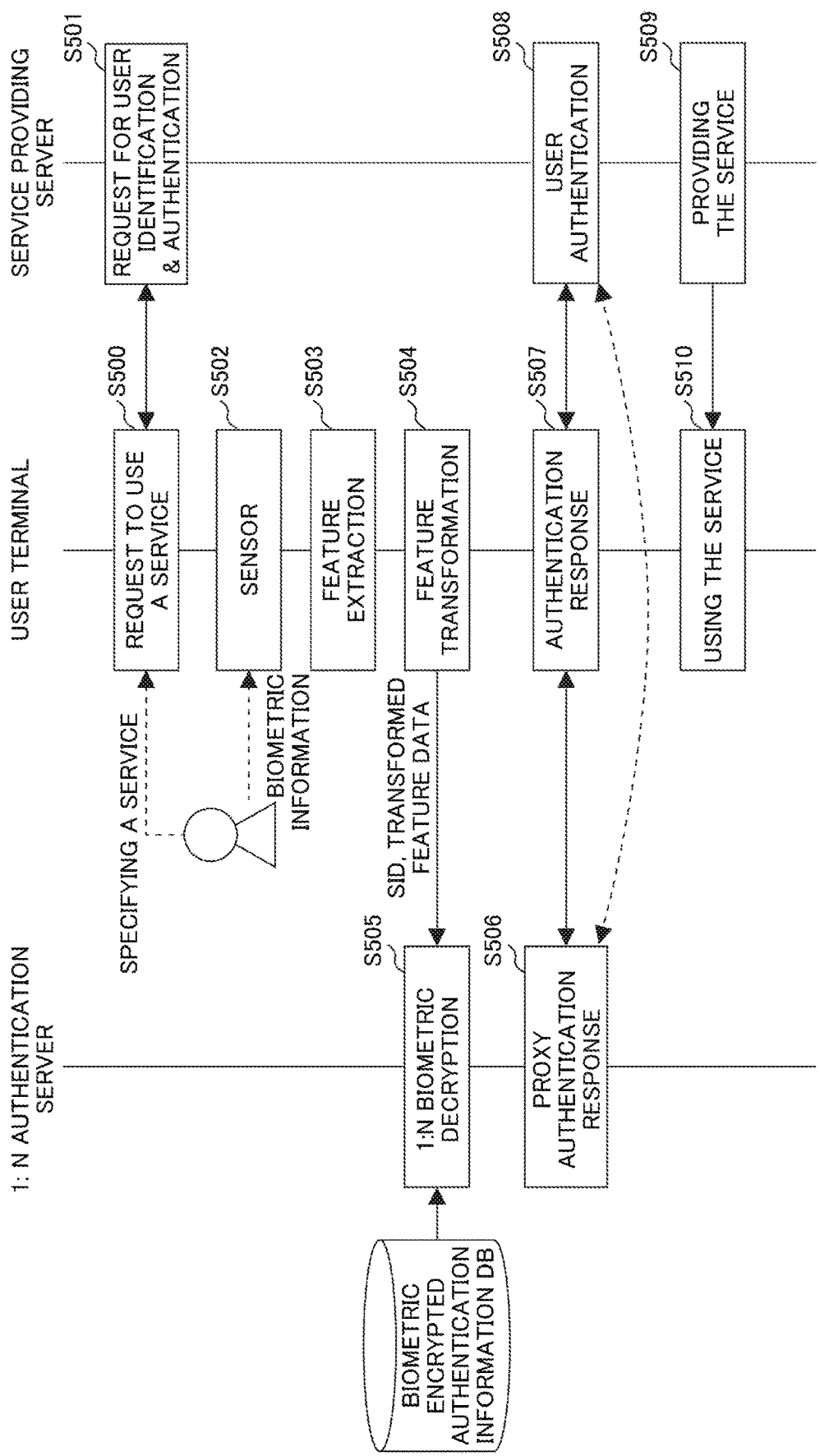
FIG. 5 is a flow diagram illustrating an authentication process according to the embodiment of the present invention.

FIG. 5 is a diagram illustrating an authentication process flow according to the present embodiment.

S500 is a processing step in which the user terminal 200 accepts a user request to utilize a service and identifies the service identifier (SID) and transmits a service use request to a service providing server 400 appropriate for the service identifier (SID).

S501 is a processing step in which, upon receiving the service use request at S500, the service providing server 400 transmits a user ID identification and authentication request to the user terminal 200.

S502 is a processing step in which the user terminal 200 acquires biometric information for user authentication through the sensor.

S503 is a processing step in which the user terminal 200 acquires feature data for authentication from the biometric information for authentication.

S504 is a processing step in which the user terminal transforms feature data for authentication, thus creating transformed feature data for authentication, and transmits this information together with the service identifier (SID) to the 1:N authentication server 300. A concrete example of transformation will be described later with FIG. 6. This step enables it to conceal feature data for authentication as well, as against the 1:N authentication server 300.

S505 is a decryption processing step to be executed when the 1:N authentication server 300 receives the service identifier (SID) and feature data for authentication. Specifically, the server searches the biometric encrypted authentication information DB 301 for a record including SID that matches the service identifier (SID) received; when there are N (N≥1) pieces of such record in the DB, the server performs 1:N biometric decryption. Detail of this decryption process will be described later with FIG. 6. And now, if the decryption is unsuccessful, the server notifies the user terminal 200 that authentication is unsuccessful. In this case, the user terminal 200 terminates the authentication process or may retry authentication, returning to step S502.

If the 1:N biometric decryption is successful at S505, S506 is a processing step in which the 1:N authentication server 300 performs a proxy authentication response using decrypted authentication information (user ID and confidential information for authentication); this response is transmitted to the service providing server 400 via the user terminal 200.

S507 is a processing step in which the user terminal 200 performs an authentication response; in particular, the user terminal forwards the user identification and authentication request (S501) received from the service providing server 400 to the 1:N authentication server 300, receives the proxy authentication response (S506) from the 1:N authentication server 300, and forwards this response to the service providing server 400. And now, the process configuration may be modified such that the 1:N authentication server 300 directly communicates with the service providing server 400 without intervention of the user terminal 200 to transmit an authentication response to the service providing server 400 instead of authentication response processing at S507.

S508 is a processing step in which the service providing server 400 receives the authentication response S507 from the user terminal 200 or the 1:N authentication server 300 and performs a user authentication process.

If the user authentication process is successful at S508, S509 is a processing step in which the service providing server 400 provides the service to the user terminal 200. And now, if the user authentication is unsuccessful at S508, the server terminates the process without providing the service. If the user authentication process is successful at S508, S510 is a processing step in which the user terminal 200 is provided with the service from the service providing server 400 and utilizes the service. In the following, concrete examples of the feature transformation steps (S306) (S504), the biometric encryption step (S308), and the 1:N biometric decryption step (S505) will be described with text complementally.

As an example, feature data is represented as a bit string of n bits and when a Hamming distance between feature data for registration and feature data for authentication is equal to or less than t bits (t<n), the user should be determined as the identical person.

The registration terminal 100 and the user terminal 200 share and store secret random information r consisting of n bits beforehand.

In the feature transformation step (S306), a calculation is made of exclusive OR between feature data for registration x and r, $y=x(+)r$ ($(+)$ is a sign of exclusive OR) and the y is taken as transformed feature data for registration.

Also in the feature transformation step (S504) in the authentication flow, similarly, a calculation is made of exclusive OR between feature data for authentication x' and r, $y'=x'(+)r$ ($(+)$ is a sign of exclusive OR) and the y' is taken as transformed feature data for registration.

Here, it should be noted that $y(+)y'=(x(+)r)(+)(x'(+)r)=x(+)x'$ indicates that Hamming distance between y and y' and Hamming distance between x and x' are equal.

In the biometric encryption step (S308), the step first constructs an error correction code with code length of n and minimum distance of 2t+1 and randomly selects one code word w from the error correction code. Then, the step calculates auxiliary information $c=y(+)w$ for transformed feature data for registration y. The step further calculates $k=\text{hash}(w)$ using a suitable hash function $h(\cdot)$. Regarding the k as an encryption key, the step encrypts authentication information using a suitable encryption algorithm (e.g. AES), thus creating encrypted authentication information. Then, the step outputs a combination of the auxiliary information c and the encrypted authentication information as biometric encrypted authentication information.

FIG. 6 is a diagram illustrating the detail of the 1:N biometric decryption step S505.

S601 is a processing step in which the user terminal 200 searches the biometric encrypted authentication information DB for a record including a service identifier that matches the service identifier (SID) received from the user terminal 200 (it is assumed that there are n records in the DB).

S602 is a processing step of decrypting biometric encryption; this step decrypts biometric encrypted authentication information in each of records for which the matching was found using transformed feature data for authentication as a decryption key. Specifically, a calculation is made of exclusive OR between auxiliary information c included in the biometric encrypted authentication information and transformed feature data for authentication y', w'=c(+)y'=(y(+)w)(+)(y')=w(+)(y(+)y'). y(+)y' has Hamming weight of t or below, when Hamming distance between y and y' is equal to or less than t, that is, when Hamming distance between x and x' is equal to or less than t. Therefore, it should be noted that w' becomes information corresponding to w that involves errors of t bits or less. Next, decryption processing in the error correction code is performed for w'. Since the minimum distance of the error correction code is 2t+1, the errors of t bits or less can be corrected properly. Therefore, if Hamming distance between x and x' is equal to or less than t (that is, if biometric information by which the user should be determined as the identical person was input), w can be restored properly. That is, if the distance between encoded feature data for authentication and encoded feature data for registration is equal to or less than a predefined value, decrypting to correct authentication information is carried out. In other words, it can be stated that, if a degree of similarity between encoded feature data for authentication and encoded feature data for registration is equal to or more than a predefined value, decrypting to correct authentication information is carried out.

Once having obtained w" by successful decryption, a calculation is made of k'=hash (w"). Regarding k' as a decryption key, the step decrypts encrypted authentication information included in biometric encrypted authentication information using the encryption algorithm mentioned previously.

S603 is a processing step to generate verification information for the decrypted authentication information in the same way as in step (S307) and compare it with decrypted verification information. This step is taken as "successful" if there is a match between both pieces of verification information, and as "unsuccessful" if there is a mismatch. Furthermore, if the decryption processing for the error correction code in the step (S602) is unsuccessful (if the process failed to calculate w"), the process is again regarded as "unsuccessful" at the step (S603). It should be noted that the process is taken as "successful" at the step (S603), if Hamming distance between x and x' is equal to or less than t, which gives that w"=w, k'=k.

S604 is a processing step to identify the user if the process was taken as "successful" at the step (S603). In this case, Hamming distance between w and w' (≤t) corresponds to Hamming distance between x and x'. When there are plural records for which the process is taken as "successful" at the step (S603), a record for which a smaller value of t' is obtained is considered to represent that the user is more likely to be the identical person. Thus, the user is uniquely identified in such a way that a record for which d is smallest is used to authenticate the user as the identical person or the first found one of records for which d is equal to or less than a threshold t' that is smaller than t is used to authenticate the user as the identical person.

In the present embodiment, there is no need to store any information that is created from user's biometric information or any information constituting user's biometric information in a user terminal 200. Moreover, there is no need to store any information that identifies a user terminal 200 in the 1:N authentication server 300 and a service providing server 400. Therefore, when utilizing one of diverse services, the user is allowed to utilize it from an arbitrary user terminal without registering or limiting a user terminal for use in advance. Furthermore, it also becomes possible to share one terminal with many and unspecified users.

Furthermore, operations at a user terminal 200 in the authentication flow of the present embodiment, when viewed from a perspective of a service providing server 400, cannot be distinguished from processing for ordinary password authentication, PKI authentication, and FIDO authentication. Hence, a user can use an authentication method based only on biometric information with no modifications being made to user authentication functionality in a service providing server 400 and user authentication information (a password, a public key, etc.) previously registered in the user information DB 401.

Furthermore, in the authentication flow of the present embodiment, when utilizing a service, a user is not required to present or input his or her user ID (UID). This is because identifying the user is carried out by the 1:N authentication server 300 based only on biometric information and presenting the user ID to a service providing server 400 is also carried out by the server as a proxy. Additionally, since the registration and authentication processing flows are carried out based on encrypting authentication information (including user ID and confidential information for authentication) and its verification information by biometric encryption and 1:N biometric decryption processing, it is not needed to directly store biometric information for registration and biometric feature data for registration, and authentication information and these pieces of information is highly protected. Thereby, it is possible to implement safe and secure authentication, minimizing the risk of leakage of biometric information and authentication information.

As described hereinbefore, according to the present invention, authentication can be performed conveniently and safely only by undergoing biometric authentication without limiting user and terminal combinations, without reconfiguring a service server, and without requiring a user to enter an ID or present a card among others, when a user utilizes a variety of existing online services from one or plural terminals.

REFERENCE SINGS LIST

100: registration terminal,
101: service specifying function,
102: user ID input function,
103: authentication input (creation) function,
104: certificate creation function,
105: sensor,
106: feature extraction function,
107: feature transformation function,
108: verification information creation function,
109: biometric encryption function, 110: registration function,
200: user terminal,
201: service use function,
202: sensor,
203: feature extraction function,
204: feature transformation function,
205: authentication response function,
300: 1:N authentication server,
301: biometric encrypted authentication information DB,
302: 1:N biometric decryption function,
303: proxy authentication response function,
400: service providing server,
401: user information DB,
402: user authentication function,
403: service providing function,
500: network,
700: CPU,
701: memory,
702: storage,
703: input device,
704: output device,
705: communication device.

The invention claimed is:

1. An authentication system including a user terminal and an authentication server which is connected with the user terminal across a network,
wherein the user terminal comprises a sensor which acquires biometric information of a user, and a computer programmed to:
extract feature data for authentication from acquired biometric information;
encode the feature data for authentication to create encoded feature data for authentication;
transmit identification request information including the encoded feature data for authentication to an external entity;
wherein the authentication server comprises a DB for storing biometric encrypted authentication information, and an authentication server processor programmed to:
search for biometric encrypted authentication information included in the DB, based on the identification request information;
decrypt biometric encrypted authentication information searched out using the encoded feature data for authentication as a decryption key and uniquely identifies a user, based on authentication information obtained by the decryption; and
perform authentication response processing with respect to the identified user, based on authentication information obtained by decryption, instead of the user terminal;
wherein the biometric encrypted authentication information is information obtained by encrypting authentication information of a user using encoded feature data for registration as an encryption key, the encoded feature data resulting from encoding feature data for registration extracted from biometric information acquired when the user is registered;
wherein the authentication server processor is programmed to perform decrypting to correct authentication information, if a degree of similarity between the encoded feature data for authentication and the encoded feature data for registration is equal to or more than a predefined value; and
wherein the authentication server processor is programmed, if the degree of similarity between the encoded feature data for authentication, which is used as the decryption key to decrypt the biometric encrypted authentication information searched out in the DB, and the encoded feature data for registration, which is used as the encryption key to encrypt the authentication information of the user to obtain the biometric encrypted authentication information, is equal to or more than the predefined value, to perform decrypting to correct authentication information, and to perform the authentication response processing with respect to the identified user based on the authentication information obtained by decryption instead of the user terminal; and wherein if the degree of similarity is less than the predefined value, the authentication response processing is performed by the user terminal.

2. The biometric authentication system according to claim 1, wherein:
when a user authentication method is password authentication, the authentication information includes password information to be used when a user utilizes a service.

3. The biometric authentication system according to claim 1, wherein:
when a user authentication method is a public key encryption method, the authentication information includes information corresponding to a secret key to be used when a user utilizes a service.

4. The biometric authentication system according to claim 1, wherein:
the authentication information includes a user ID to be used when a user utilizes a service.

5. The biometric authentication system according to claim 1, wherein:
the authentication information includes verification information for verifying correctness of the authentication information; and
the authentication server processor is programmed to determine whether or not decrypted authentication information is correct, based on the verification information.

6. The biometric authentication system according to claim 5, wherein:
the authentication server processor is programmed to execute an error correction process and a process comprising determining biometric encrypted authentication information for which a quantity of error information corrected by the error correction process is least as the one authenticating the correct user and associating that authentication information with the user.

7. The biometric authentication system according to claim 5, wherein:
the authentication server processor is programmed to execute an error correction process and a process comprising determining biometric encrypted authentication information for which a quantity of error information corrected by the error correction process is less than a predefined value as the one authenticating the correct user and associating that authentication information with the user.

8. The biometric authentication system according to claim 7, wherein
the DB associates and stores the biometric encrypted authentication information and a service type;
the identification request information includes an identifier to identify a service type; and the authentication server processor is programmed to search for biometric encrypted authentication information associated with a service type, based on the identifier.

9. An authentication server that is connected with a user terminal across a network, the user terminal comprising a sensor which acquires biometric information of a user; and a computer programmed to extract feature data for authentication from acquired biometric information, encode the feature data for authentication to create encoded feature data for authentication, and transmit identification request information including the encoded feature data for authentication to an external entity, the authentication server comprising a DB for storing biometric encrypted authentication information, and an authentication server processor programmed to:
search for biometric encrypted authentication information included in the DB, based on the identification request information;
decrypt biometric encrypted authentication information searched out using the encoded feature data for authentication as a decryption key and uniquely identifies a user, based on authentication information obtained by the decryption; and
perform authentication response processing with respect to the identified user, based on authentication information obtained by decryption, instead of the user terminal;
wherein the biometric encrypted authentication information is information obtained by encrypting authentication information of a user using encoded feature data for registration as an encryption key, the encoded feature data resulting from encoding feature data for registration extracted from biometric information acquired when the user is registered;
wherein the authentication server processor is programmed to perform decrypting to correct authentication information, if a degree of similarity between the encoded feature data for authentication and the encoded feature data for registration is equal to or more than a predefined value; and
wherein the authentication server processor is programmed, if the degree of similarity between the encoded feature data for authentication, which is used as the decryption key to decrypt the biometric encrypted authentication information searched out in the DB, and the encoded feature data for registration, which is used as the encryption key to encrypt the authentication information of the user to obtain the biometric encrypted authentication information, is equal to or more than the predefined value, to perform decrypting to correct authentication information, and to perform the authentication response processing with respect to the identified user based on the authentication information obtained by decryption instead of the user terminal; and wherein if the degree of similarity is less than the predefined value, the authentication response processing is performed by the user terminal.

10. The authentication server according to claim 9, wherein:
when a user authentication method is password authentication, the authentication information includes password information to be used when a user utilizes a service.

11. The authentication server according to claim 9, wherein:
when a user authentication method is a public key encryption method, the authentication information includes information corresponding to a secret key to be used when a user utilizes a service.

12. The authentication server according to claim 9, wherein:
the authentication information includes a user ID to be used when a user utilizes a service.

13. The authentication server according to claim 9, wherein:
the authentication information includes verification information for verifying correctness of the authentication information; and
the authentication server processor is programmed to determine whether or not decrypted authentication information is correct, based on the verification information.

14. The authentication server according to claim 13, wherein:
the authentication server processor is programmed to execute an error correction process and a process comprising determining biometric encrypted authentication information for which a quantity of error information corrected by the error correction process is least as the one authenticating the correct user and associating that authentication information with the user.

15. The authentication server according to claim 13, wherein:
the authentication server processor is programmed to execute an error correction process and a process comprising determining biometric encrypted authentication information for which a quantity of error information corrected by the error correction process is less than a predefined value as the one authenticating the correct user and associating that authentication information with the user.

16. The authentication server according to claim 15, wherein
the DB associates and stores the biometric encrypted authentication information and a service type;
the identification request information includes an identifier to identify a service type; and
the authentication server processor is programmed to search for biometric encrypted authentication information associated with a service type, based on the identifier.

* * * * *